US010804809B1

(12) United States Patent
Yelaverthi et al.

(10) Patent No.: US 10,804,809 B1
(45) Date of Patent: Oct. 13, 2020

(54) HIGH FREQUENCY LINK COUPLED MULTI-PORT CONVERTER TOPOLOGY

(71) Applicant: Utah State University, Logan, UT (US)

(72) Inventors: Dorai Babu Yelaverthi, North Logan, UT (US); Regan A Zane, Hyde Park, UT (US)

(73) Assignee: Uath State University, Cache County, Logan, UT (US)

( * ) Notice: Subject to any disclaimer, the term of this patent is extended or adjusted under 35 U.S.C. 154(b) by 0 days.

(21) Appl. No.: 16/443,783

(22) Filed: Jun. 17, 2019

(51) Int. Cl.
*H02M 3/335* (2006.01)
*H02J 1/10* (2006.01)
*H02J 7/00* (2006.01)
*H02J 1/00* (2006.01)
*H02M 1/00* (2006.01)

(52) U.S. Cl.
CPC ......... *H02M 3/33584* (2013.01); *H02J 1/102* (2013.01); *H02J 1/002* (2020.01); *H02J 7/007* (2013.01); *H02J 2207/20* (2020.01); *H02M 2001/0064* (2013.01); *H02M 2001/0067* (2013.01)

(58) Field of Classification Search
CPC . H02M 2001/0064; H02M 2001/0083; H02M 3/33569; H02M 3/33576; H02M 3/33584; H02J 7/0063; H02J 7/007; H02J 2207/20
See application file for complete search history.

(56) References Cited

U.S. PATENT DOCUMENTS

| | | | | |
|---|---|---|---|---|
| 8,466,662 | B2 * | 6/2013 | Nania | H02J 3/383 323/207 |
| 10,263,456 | B1 * | 4/2019 | Wang | H02M 3/33584 |
| 2008/0212340 | A1 * | 9/2008 | Tao | H02M 3/33584 363/17 |
| 2012/0313440 | A1 * | 12/2012 | Watelmacher | H02S 40/30 307/77 |
| 2014/0001858 | A1 * | 1/2014 | Kwasinski | H02M 3/33569 307/52 |

(Continued)

OTHER PUBLICATIONS

Yelaverthi et al., "High-Frequency-Link Isolated Modular Multi-level Converter (I-M2C) Topology," 2018 IEEE International Power Electronics and Application Conference and Exposition (PEAC), Dec. 27, 2018, pp. 1-6, Shenzhen.

*Primary Examiner* — Fred E Finch, III

(57) ABSTRACT

A power converter apparatus includes a plurality of inverters where each inverter receives power from a separate DC voltage source. The apparatus includes a magnetic structure. The magnetic structure includes a primary winding for each inverter, where each primary winding is connected to an output a corresponding inverter and each primary winding is coupled to a magnetic core, and a single secondary winding coupled to one or more magnetic cores to which each primary winding is coupled. The apparatus includes a rectifier that receives an AC waveform from the secondary winding and that rectifies the AC waveform and is connected to a load at output terminals. The secondary winding includes a secondary bus and the one or more magnetic cores of the magnetic structure that are arranged to provide a pathway for the secondary winding that minimizes a length of the secondary winding.

20 Claims, 10 Drawing Sheets

(56) References Cited

U.S. PATENT DOCUMENTS

| | | | |
|---|---|---|---|
| 2014/0016370 A1* | 1/2014 | Chandrasekaran | H01F 3/14 363/21.12 |
| 2014/0203737 A1* | 7/2014 | Prodic | H02J 7/0014 318/139 |
| 2016/0016479 A1* | 1/2016 | Khaligh | H02M 3/33561 363/17 |
| 2016/0172984 A1* | 6/2016 | Takagi | H02M 3/1582 363/17 |
| 2017/0063245 A1* | 3/2017 | Takagi | H02M 1/14 |
| 2017/0070155 A1* | 3/2017 | Takahara | H02M 3/33569 |
| 2018/0076723 A1* | 3/2018 | Li | H02M 3/33569 |
| 2018/0138801 A1* | 5/2018 | Chen | H02M 3/33576 |
| 2019/0108937 A1* | 4/2019 | Nakajima | H02M 3/33569 |
| 2019/0165573 A9* | 5/2019 | Perreault | H02J 1/00 |
| 2019/0238059 A1* | 8/2019 | Dai | H02M 3/33576 |
| 2020/0007022 A1* | 1/2020 | De Doncker | H02M 3/3376 |
| 2020/0076311 A1* | 3/2020 | Bortis | H02M 3/285 |

\* cited by examiner

HIGH FREQUENCY LINK COUPLED MULTI-PORT CONVERTER TOPOLOGY

FIELD

This invention relates to power converters and more particularly relates to a high-frequency link coupled multi-port converter topology.

BACKGROUND

Many computer systems and other electronics source power from a single voltage source and then have multiple outputs or vice-versa; multiple sources and a single load. Typically, an intermediate direct current ("DC") or alternating current ("AC") bus is used to combine power from multiple sources and then fed to the load. Multiple individual converters are typically used. A disadvantage to this topology are multiple connections to the intermediate bus where each connection has termination losses, and the cost and size associated with multiple converters. The topology claimed here is a single converter with multiple ports that can reduce the cost of implementation of power converter. This topology can be bidirectional and used for regulating batteries, but controls managing battery sharing can be difficult relative to using individual independent converters.

SUMMARY

A power converter apparatus includes a plurality of inverters where each inverter receives power from a separate DC voltage source and each inverter includes switches and generates an AC waveform at an output of the inverter. The apparatus includes a magnetic structure. The magnetic structure includes a primary winding for each inverter, where each primary winding is connected to an output a corresponding inverter and each primary winding is coupled to a magnetic core, and a single secondary winding coupled to one or more magnetic cores to which each primary winding is coupled. The apparatus includes a rectifier that receives an AC waveform from the secondary winding and that rectifies the AC waveform and is connected to a load at output terminals. The secondary winding includes a secondary bus and the one or more magnetic cores of the magnetic structure that are arranged to provide a pathway for the secondary winding that minimizes a length of the secondary winding.

A system for charging and discharging battery cells includes a plurality of battery units where each battery unit includes one or more battery cells and each battery unit is acting as a DC voltage source. The system includes a battery charge/discharge unit that includes a plurality of inverters. Each inverter receives power from battery unit and each inverter includes switches and generates an AC waveform at an output of the inverter. The battery charge/discharge unit includes a magnetic structure. The magnetic structure includes a primary winding for each inverter where each primary winding is connected to an output a corresponding inverter and each primary winding is coupled to a magnetic core. The magnetic structure includes a single secondary winding coupled to one or more magnetic cores to which each primary winding is coupled. The battery charge/discharge unit includes a rectifier that receives an AC waveform from the secondary winding, that rectifies the AC waveform and is connected to a load at output terminals. The secondary winding includes a secondary bus and the one or more magnetic cores of the magnetic structure are aligned to provide a pathway for the secondary winding that minimizes a length of the secondary winding.

Another power converter apparatus includes a plurality of inverters where each inverter receives power from a separate DC voltage source and each inverter includes switches in a full-bridge configuration and generates an AC waveform at an output of the inverter. The apparatus includes a magnetic structure. The magnetic structure includes a primary winding for each inverter where each primary winding is connected to an output a corresponding inverter and each primary winding is coupled to a magnetic core. The magnetic structure includes a single secondary winding coupled to each magnetic core, where the secondary winding is a secondary bus and the magnetic cores of the magnetic structure are aligned to provide a pathway for the secondary winding that minimizes a length of the secondary winding. The apparatus includes a rectifier that receives an AC waveform from the secondary winding and that rectifies the AC waveform and is connected to a load at output terminals. The rectifier includes switches in a full-bridge configuration. The apparatus includes a resonant tank connected in series between the secondary winding and the rectifier. The resonant tank includes a resonant inductor and a resonant capacitor connected in series.

The apparatus includes a controller that regulates one of output voltage at the output terminals and output current to the load at the output terminals for varying load conditions, and regulates power drawn from each DC voltage source such that power from the DC voltage sources are allowed to differ from each other. The controller regulates output voltage or load current and regulates power from the DC voltage sources by adjusting switching of the inverters and switching of switches in the rectifier.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
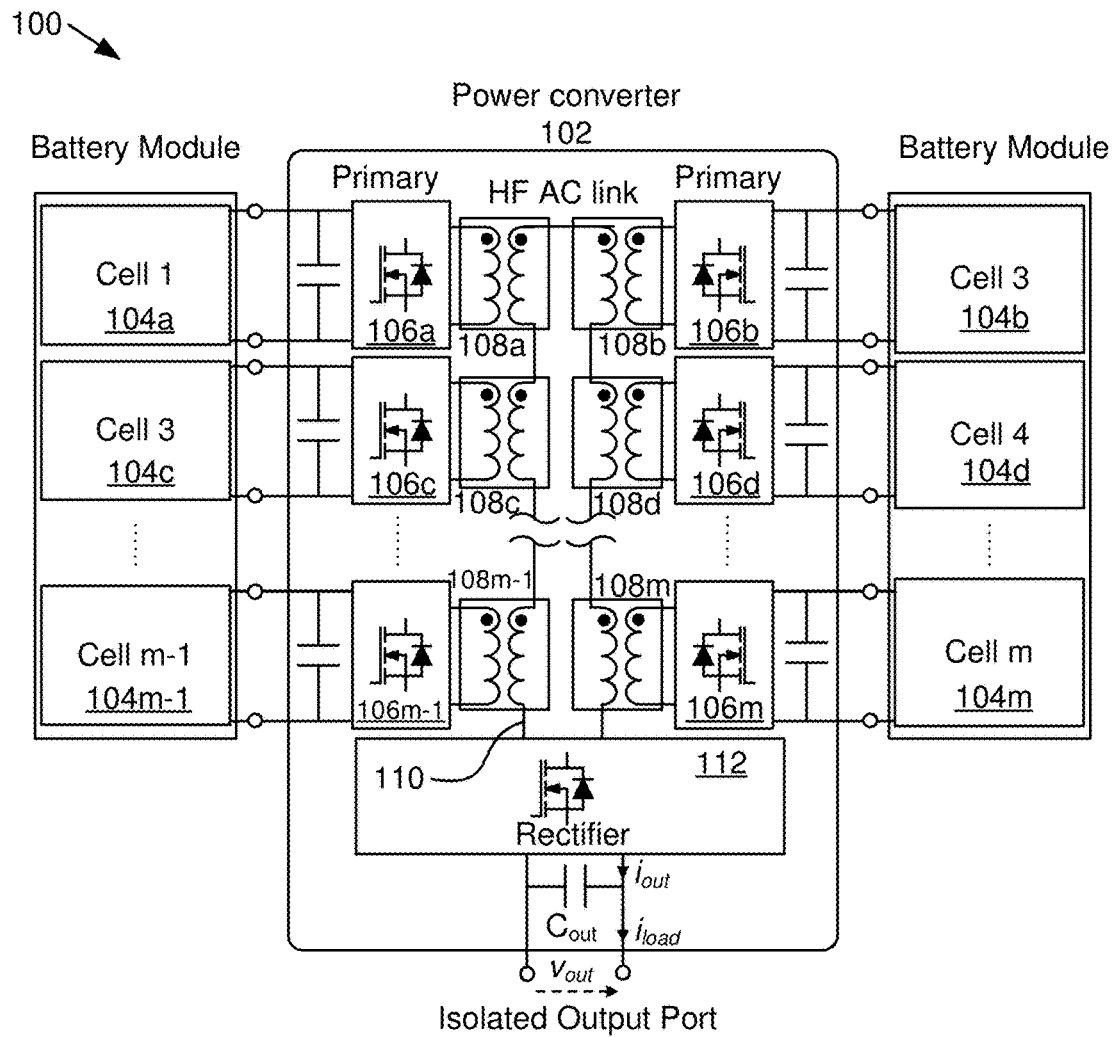
FIG. 1 is a schematic block diagram illustrating one embodiment of a system with a battery cells feeding a high-frequency link coupled multi-port converter topology.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

These features and advantages of the embodiments will become more fully apparent from the following description and appended claims, or may be learned by the practice of embodiments as set forth hereinafter. As will be appreciated by one skilled in the art, aspects of the present invention may be embodied as an apparatus, a system, or a method. Accordingly, aspects of the present invention may take the form of an entirely hardware embodiment, a partial software embodiment (including firmware, resident software, microcode, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, circuits, and the like in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

Portions of the modules, circuits, etc. may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computing device or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A power converter apparatus includes a plurality of inverters where each inverter receives power from a separate direct current ("DC") voltage source and each inverter includes switches and generates an alternating current ("AC") waveform at an output of the inverter. The apparatus includes a magnetic structure. The magnetic structure includes a primary winding for each inverter, where each primary winding is connected to an output a corresponding inverter and each primary winding is coupled to a magnetic core, and a single secondary winding coupled to one or more magnetic cores to which each primary winding is coupled. The apparatus includes a rectifier that receives an AC waveform from the secondary winding and that rectifies the AC waveform and is connected to a load at output terminals. The secondary winding includes a secondary bus and the one or more magnetic cores of the magnetic structure that are arranged to provide a pathway for the secondary winding that minimizes a length of the secondary winding.

In some embodiments, the apparatus includes a resonant tank connected in series between the secondary winding and the rectifier. The resonant tank includes a resonant inductor and a resonant capacitor connected in series. In other embodiments, the apparatus is a non-resonant dual-active bridge topology with an inductor connected between the secondary winding and the rectifier. In other embodiments, the inverter is a full-bridge inverter with four switches. In other embodiments, the rectifier is a full-bridge rectifier with four switches and the apparatus includes a low-pass filter. The low-pass filter includes a capacitor connected in parallel with the output terminals.

In some embodiments, the apparatus includes a controller, where the controller regulates output voltage at the output terminals or output current to the load at the output terminals for varying load conditions and regulates power drawn from each DC voltage source such that power from the DC voltage sources are allowed to differ from each other. The controller regulates output voltage or load current and regulates power from the DC voltage sources by adjusting switching of the inverters and switching of switches in the rectifier. In other embodiments, the controller regulates output voltage or load current and regulates power from the DC voltage sources by adjusting switching of the inverters and switching of switches in the rectifier by regulating a phase shift between switching of the rectifier and switching of each of the inverters and by regulating a duty cycle of switching of the rectifier and a duty cycle of switching of each inverter.

In other embodiments, the controller uses a switching waveform of the rectifier as a reference point and determines a phase shift for each inverter based on the rectifier reference point. In other embodiments, a turns ratio of a primary winding to the secondary winding of each magnetic core is n and a primary effective voltage across a secondary side of a $k^{th}$ magnetic core is $n\vec{v}_{p,k}$ and a primary effective voltage across the secondary side of a $k^{th}$ magnetic core of m magnetic cores is:

$$n\sum_{k=1}^{m}\vec{v}_{p,k}$$

and each a phasor for the primary effective voltage of a $k^{th}$ magnetic core is:

$$\vec{v}_{p,k} = V_{p,k}(\cos \phi_k + j \sin \phi_k)$$

where $\phi_k$ is a phase shift between a switching waveform of the rectifier and a switching waveform of the $k^{th}$ inverter and $$V_p = \sum_{k=1}^{m} \frac{4}{\pi} \sin\left(\frac{\alpha_k}{2}\right).$$

In other embodiments, the controller regulates output voltage or output current and regulates power drawn from each DC voltage source by maintaining a fixed phase shift between switching of the rectifier and switching of each of the inverters and varies the duty cycle of each inverter. In other embodiments, the controller regulates output voltage or output current and regulates power drawn from each DC voltage source by generating a full square wave in each inverter and in the rectifier and by maintaining a reference phase shift between switching of the rectifier and switching of each of the inverters and varies the phase of each inverter and by controlling each inverter with a delta phase shift with respect to the reference phase shift.

In other embodiments, the apparatus is bidirectional and each DC voltage source includes one or more battery cells and the controller regulates output voltage or output current with an outer control loop and regulates power drawn from each of the one or more battery cells with an inner control loop for each inverter based on a battery charging/discharging algorithm. In other embodiments, each inverter is a half-bridge inverter and the controller regulates power from each DC voltage source by adjusting a phase shift between a switching waveform of the rectifier and switching waveforms of the inverters.

In some embodiments, the inverters and the rectifier each operate at a same fixed switching frequency. In other embodiments, the secondary winding includes a planar bus in a U-shaped configuration and the magnetic cores are arranged in two rows next to each other to minimize the length of the secondary winding, wherein the secondary winding passes once through each magnetic core.

A system for charging and discharging battery cells includes a plurality of battery units where each battery unit includes one or more battery cells and each battery unit is acting as a DC voltage source. The system includes a battery charge/discharge unit that includes a plurality of inverters. Each inverter receives power from battery unit and each inverter includes switches and generates an AC waveform at an output of the inverter. The battery charge/discharge unit includes a magnetic structure. The magnetic structure includes a primary winding for each inverter where each primary winding is connected to an output a corresponding inverter and each primary winding is coupled to a magnetic core. The magnetic structure includes a single secondary winding coupled to one or more magnetic cores to which each primary winding is coupled. The battery charge/discharge unit includes a rectifier that receives an AC waveform from the secondary winding, that rectifies the AC waveform and is connected to a load at output terminals. The secondary winding includes a secondary bus and the one or more magnetic cores of the magnetic structure are aligned to provide a pathway for the secondary winding that minimizes a length of the secondary winding.

In some embodiments, the system includes a resonant tank connected in series between the secondary winding and the rectifier. The resonant tank includes a resonant inductor and a resonant capacitor connected in series. In other embodiments, the system includes a controller. The controller regulates output voltage at the output terminals or output current to the load at the output terminals for varying load conditions, and regulates power drawn from each DC voltage source such that power from the DC voltage sources are allowed to differ from each other. The controller regulates output voltage or load current and regulates power from the DC voltage sources by adjusting switching of the inverters and switching of switches in the rectifier. In other embodiments, the controller regulates output voltage or load current and regulates power from the DC voltage sources by adjusting switching of the inverters and switching of switches in the rectifier by regulating a phase shift between switching of the rectifier and switching of each of the inverters and by regulating a duty cycle of switching of the rectifier and a duty cycle of switching of each inverter.

Another power converter apparatus includes a plurality of inverters where each inverter receives power from a separate DC voltage source and each inverter includes switches in a full-bridge configuration and generates an AC waveform at an output of the inverter. The apparatus includes a magnetic structure. The magnetic structure includes a primary winding for each inverter where each primary winding is connected to an output a corresponding inverter and each primary winding is coupled to a magnetic core. The magnetic structure includes a single secondary winding coupled to each magnetic core, where the secondary winding is a secondary bus and the magnetic cores of the magnetic structure are aligned to provide a pathway for the secondary winding that minimizes a length of the secondary winding. The apparatus includes a rectifier that receives an AC waveform from the secondary winding and that rectifies the AC waveform and is connected to a load at output terminals. The rectifier includes switches in a full-bridge configuration. The apparatus includes a resonant tank connected in series between the secondary winding and the rectifier. The resonant tank includes a resonant inductor and a resonant capacitor connected in series.

The apparatus includes a controller that regulates one of output voltage at the output terminals and output current to the load at the output terminals for varying load conditions, and regulates power drawn from each DC voltage source such that power from the DC voltage sources are allowed to differ from each other. The controller regulates output voltage or load current and regulates power from the DC voltage sources by adjusting switching of the inverters and switching of switches in the rectifier.

FIG. 1 is a schematic block diagram illustrating one embodiment of a system 100 with a battery cells 104 feeding a high-frequency link coupled multi-port converter topology. The system 100 includes a power converter 102 connected to battery cells 104a-m, which are DC voltage sources. In some embodiments, battery cells are stacked together to form a battery unit (e.g. 104a), which is connected to an inverter (e.g. 106a). As used herein, "battery cell" and "battery unit" are interchangeable where a single battery cell (e.g. 104a) may be connected to an inverter 106a or a battery unit 104a with multiple battery cells may be connected to an inverter 106a.

The power converter 102 includes inverters 106 where with an inverter (e.g. 106a) for each battery cell (e.g. 104a). The power converter 102 also includes transformers 108a-m with a transformer (e.g. 108a) for each inverter (e.g. 106a). A primary winding of each transformer 108 is wound through a magnetic core and connects to an output of the corresponding inverter 106. A secondary winding 110 loops through all of the magnetic cores of the transformers 108 and connects to a single rectifier 112. In some embodiments, the secondary winding 110 can be made of series connected smaller sections or can be made as one large winding that winds through all the magnetic cores. The relatively large secondary winding 110 is wound through all the magnetic cores of the magnetic structure such that the secondary winding 110 couples with of the primary windings. The rectifier 112 connects to output terminals, which are available for connection to a load (not shown) with output voltage vow measured across the output terminals and output current $i_{load}$ is fed to the load. Typically, an output capacitor $C_{out}$ is connected across the output terminals and may be part of a low pass filter, which may include an inductor (not shown) or other components.

Figure 2:
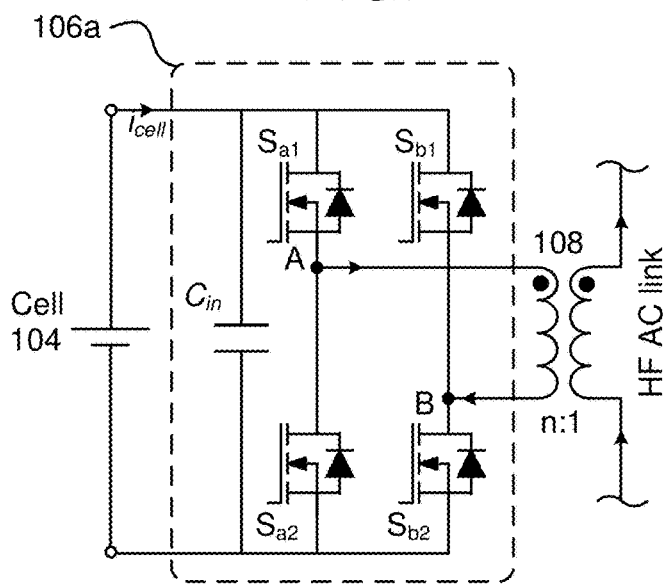
FIG. 2 is a schematic block diagram illustrating one embodiment of an inverter with a high-frequency link.

The inverters 106 convert DC voltage to an AC voltage. In one embodiment, the inverters 106 each include switches that turn on and off to generate an AC voltage. Typically, a switch is a semi-conductor switch, such as a metal-oxide-semiconductor field-effect transistor ("MOSFET") or similar switch capable of operation at higher frequencies, such as over one kilohertz. In some embodiments, the inverters 106 are in a full-bridge configuration, as depicted in FIG. 2. FIG. 2 is a schematic block diagram illustrating one embodiment of an inverter 106 with a high-frequency link and a transformer 108. The inverter 106 is representative of any of the inverters 106a-n in the power converter 102 of FIG. 1. The transformer 108 is representative of any of the transformers 108a-m of FIG. 1 in embodiments with multiple transformers 108. The inverter 106 includes a first switching leg A that includes a first switch $S_{a1}$ and a second switch $S_{a2}$ connected in series with a connection point A between the switches $S_{a1}$, $S_{a2}$. The inverter 106 includes a second switching leg B that includes a first switch $S_{b1}$ and a second switch $S_{b2}$ connected in series with a connection point B between the switches $S_{b1}$, $S_{b2}$.

The inverter 106 has an input connected to a battery cell 104 and, in some embodiments, includes an input capacitor $C_{in}$ across input terminals. Other embodiments include a different DC voltage source. Output terminals of the inverter 106 connect to a transformer 108 where a primary winding of the transformer 108 connects to connection points A and B. A secondary winding of the transformer 108 is part of a high-frequency link that links the secondary windings of each transformer 108a-m with a secondary winding 110. In other embodiments, the inverter 106 is a half-bridge inverter that includes a single switching leg with two switches (e.g. the first switching leg of FIG. 2).

Returning to the system 100 of FIG. 1, each inverter (e.g. 106a) is connected to a primary winding of a transformer (e.g. 108a) and a secondary winding 110 runs through the magnetic core of each transformer 108a-m and is connected to a rectifier 112. The rectifier 112 provides power to output terminals. In some embodiments, the power converter 102 is bidirectional and receives power from the output terminals. The roles of primary bridges (inverters 106) and secondary bridge (rectifier 112) can be interchanged so that power can flow back to the source if required. In some embodiments, the rectifier 112 is a full-bridge rectifier. In other embodiments, the rectifier 112 is a full-bridge rectifier with switches. For example, the rectifier 112 may have a similar configuration to the inverter 106 of FIG. 2 except that the top and bottom rails connected to the battery cell 104 in the inverter 106 are output terminals for the rectifier 112 providing power to the load and the connection points A and B of the rectifier 112 receive power from the secondary winding 110. In some embodiments, the rectifier 112 is a half-bridge rectifier circuit.

The power converter 102 in FIG. 1 does not include a resonant tank and is a non-resonant converter. In other embodiments, a resonant tank is connected between the secondary winding 110 and the rectifier 112. The resonant tank, in some embodiments, includes a resonant capacitor and a resonant inductor connected in series where the resonant tank is also connected in series with the secondary winding 110 and the rectifier 112 forming a series resonant converter topology. In other embodiments, other resonant tank topologies are used to form other resonant converter topologies.

In some embodiments, the rectifier 112 includes a low pass filter that is between switches of the rectifier 112 and the output terminals of the power converter 102. The low pass filter, in some embodiments, includes an output capacitor $C_{out}$, as depicted in FIG. 1. In other embodiments, the low pass filter includes an inductor (not shown) connected in series between the switches of the rectifier 112 and the output terminals. Other low pass filter topologies may also be used. The low pass filter serves to filter out unwanted high-frequency components from the output of the power converter 102 to provide a cleaner DC voltage to the load. One of skill in the art will recognize other resonant tank topologies and other forms of a low pass filter.

A feature of the power converter 102 is that the primary sides of the transformers 108 are decoupled from each other. The magnetic field from primary only couples to the secondary winding and not other primary windings. Advantageously, this feature allows each inverter (e.g. 106a) to provide a separate voltage across the secondary side of the corresponding transformer (e.g. 108a) so that the various secondary voltages of the transformers 108 add in series to provide an effective primary winding voltage $v_p$ that is connected directly to the rectifier 112 or connected to a resonant tank.

This decoupled primary feature of the power converter 102 provides a means to draw a different amount of power from each battery cell 104 or battery unit 104, which is advantageous in managing battery cells 104 based on a health of each cell. For example, current from each battery cell 104 may be managed by an overall battery charging/discharging algorithm. Each battery cell current/co may differ so that power from each battery cell 104 varies and a sum of the power from the batteries is summed to provide a level of power to the load as appropriate for the load. As the load changes and an overall power to the load changes, power drawn from each battery cell 104 varies while maintaining a ratio from each battery cell 104 according to the battery charging/discharging algorithm.

In some embodiments, the secondary winding 110 and the magnetic cores of the magnetic structure are aligned to provide a pathway for the secondary winding 110 that minimizes a length of the secondary winding 110. As depicted in FIG. 1, the magnetic cores are aligned in two rows so that the secondary winding 110 passes up one side and down the other side in a U-shaped configuration. In some embodiments, space between magnetic cores of the transformers 108 is minimized.

In some embodiments, the secondary winding 110 is made for high-frequency power transfer and is designed to minimize negative high-frequency effects, such as skin effect, eddy currents, etc. For example, the secondary winding 110 may be a copper foil, a Litz wire, or other structure that minimized high-frequency losses. In some embodiments, the secondary winding 110 is a secondary bus and is a copper foil on a printed circuit board ("PCB"). One of skill in the art will recognize other ways to minimize high-frequency losses in the secondary winding 110.

The primary windings of the transformers 108 are also a concern for high-frequency losses, but are lower power than the secondary winding 110 due to several inverters 106 being stacked in series. The primary windings may also be designed to minimize high-frequency losses.

The power converter 102 uses this unique high frequency ("HF") AC link to combine multiple individual converters into multi-port converter. The topology depicted in FIG. 1 can perform the task done by multiple converters but with less components. Therefore, the proposed multi-port topology helps reduce the over-all system cost by reducing the total component count. The topology of the power converter 102 uses integrated magnetics and just one central secondary winding 110 which reduces significantly the number switching devices and passive components required for the implementation of the power converter 102. Additional advantages include same ground reference for all the input ports simplifying the communications between modules. A port or primary port, as used herein, includes an inverter (e.g. 106a) connected to a voltage source, such as a battery cell (e.g. 104a) and a corresponding transformer (e.g. 108a).

The series connected HF link is a beneficial approach for applications requiring multiple regulated ports. These ports can be either source ports or load ports or bi-directional ports. The regulated parameter at the output terminals can be either current or voltage. The approach is particularly beneficial for applications where these multiple ports are physically close. Active balancing for battery cells, fuel cells, super capacitors and rack level power distribution in a data center are some applications that can benefit from this approach.

Existing multi-port converter structures tend to get exponentially complicated as the number of ports increase. The complication arises due to the direct coupling between each winding to every other winding in the integrated transformers. In the proposed topology of the power converter 102, the particular way of connecting the transformers 108 creates an unique advantage that the control is relatively easy compared to existing methods while having large number of ports. This is because of the decoupled nature of the primary windings.

Each port has a bridge that generates high frequency voltage at the output of the inverters 106. For example, high frequency may be greater than 1 kilohertz. The secondary winding that is connected to the rectifier 112 has a voltage that is the instantaneous summation of all primary bridge voltages scaled by a turns ratio n of the transformers 108. In some embodiments, summation of the primary bridge voltages can be done by either having all the secondaries connected in series on the secondary winding 110 or equivalently by having a magnetic structure that sums up the magnetic field generated by each primary bridge (e.g. inverter 106a and transformer 108a). The resultant voltage of all the primary winding voltages, in some embodiments, drives a common resonant tank (not shown). A relative magnitude of each primary voltage along with its phase with respect to secondary bridge voltage decides the power flow from each individual port. Other isolated topologies based on conventional 2-port topologies can be used as well. For example, a non-resonant dual active bridge or a parallel resonant dual active bridge may be used.

Another advantage of the topology of the power converter 102 is that output termination requirements and contact resistance for each individual DC/DC output is eliminated. If a single DC/DC converter were to be used per cell then each of those outputs are typically connected to the common bus bar and each of the secondary side of the transformer would have termination losses at the secondary bridge. In the topology of the power converter 102 of FIG. 1, the secondary-side of the transformer 108 acts as the bus bar collecting the current. Hence, serves the dual purpose of isolation and as a bus. Reduced termination losses, a lower component count, etc. all serve to improve performance and to increase efficiency. In addition, the battery cells 104, inverters 106, etc. can be referred to same ground potential, eliminating the need for isolation for the communications and control signals between different modules.

Figure 3A:
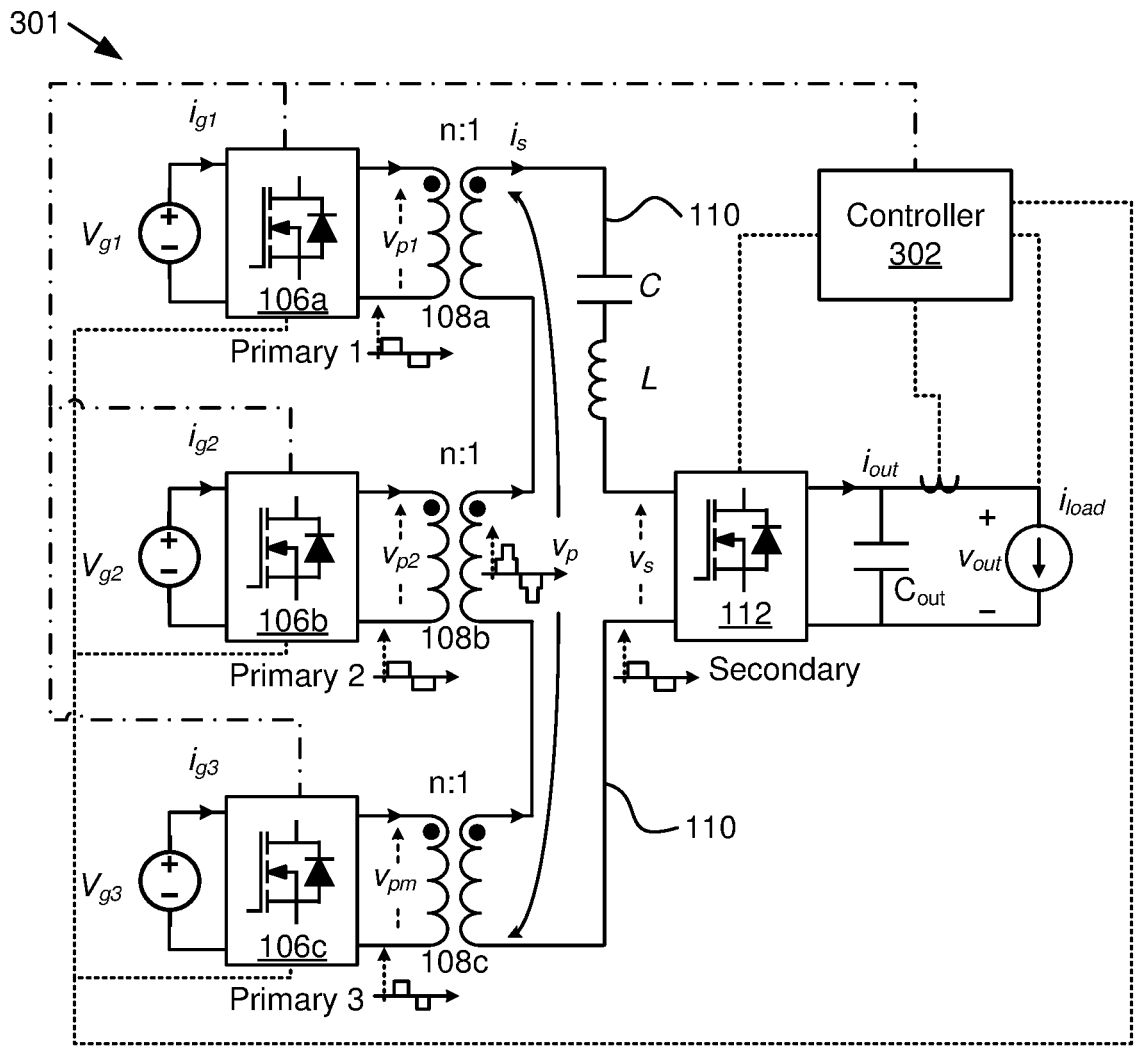
FIG. 3A is a schematic block diagram illustrating another embodiment of a system with three direct current ("DC") voltage sources feeding a high-frequency link coupled multi-port converter topology, which is connected to a load.

FIG. 3A is a schematic block diagram illustrating another embodiment of a system 300 with three DC voltage sources feeding a high-frequency link coupled multi-port converter topology, which is connected to a load. The system 300 is similar to the system 100 of FIG. 1, but only includes three primary ports and includes a resonant tank with a capacitor C and inductor L. Three primary ports are used for simplicity, but equations and principles associated with the system 300 of FIG. 3A can be scaled for m primary ports. The battery cells 104a-m of the system 100 of FIG. 1 are replaced with voltage sources $V_{g1}$, $V_{g2}$, $V_{g3}$, which may be battery cells 104 or may be another DC voltage source. In some embodiments, the voltage sources $V_{g1}$, $V_{g2}$, $V_{g3}$ are rectified AC sources. For example, a rectifier for each voltage source (e.g. $V_{g1}$) may be included in the power converter 102 of the system 300 of FIG. 3A and may also be included for the system 100 of FIG. 1 where battery cells 104a-m are not used. FIG. 3A includes a controller 302 that regulates one of output voltage $V_{out}$ at the output terminals and output current $I_{out}$ to the load at the output terminals for varying load conditions and regulates power drawn from each DC voltage source such that power from the DC voltage sources are allowed to differ from each other. The controller 302 regulates output voltage $V_{out}$ or load current $I_{out}$ and regulates power from the DC voltage sources by adjusting switching of the inverters 106 and switching of switches in the rectifier 112. In some embodiments, the system 300 is and each DC voltage source includes one or more battery cells and the controller 302 regulates output voltage $V_{out}$ or load current $I_{out}$ with an outer control loop (small dashed lines) and regulates power drawn from each of the one or more battery cells with an inner control loop (dash/dot lines) for each inverter based on a battery charging/discharging algorithm.

Figure 3B:
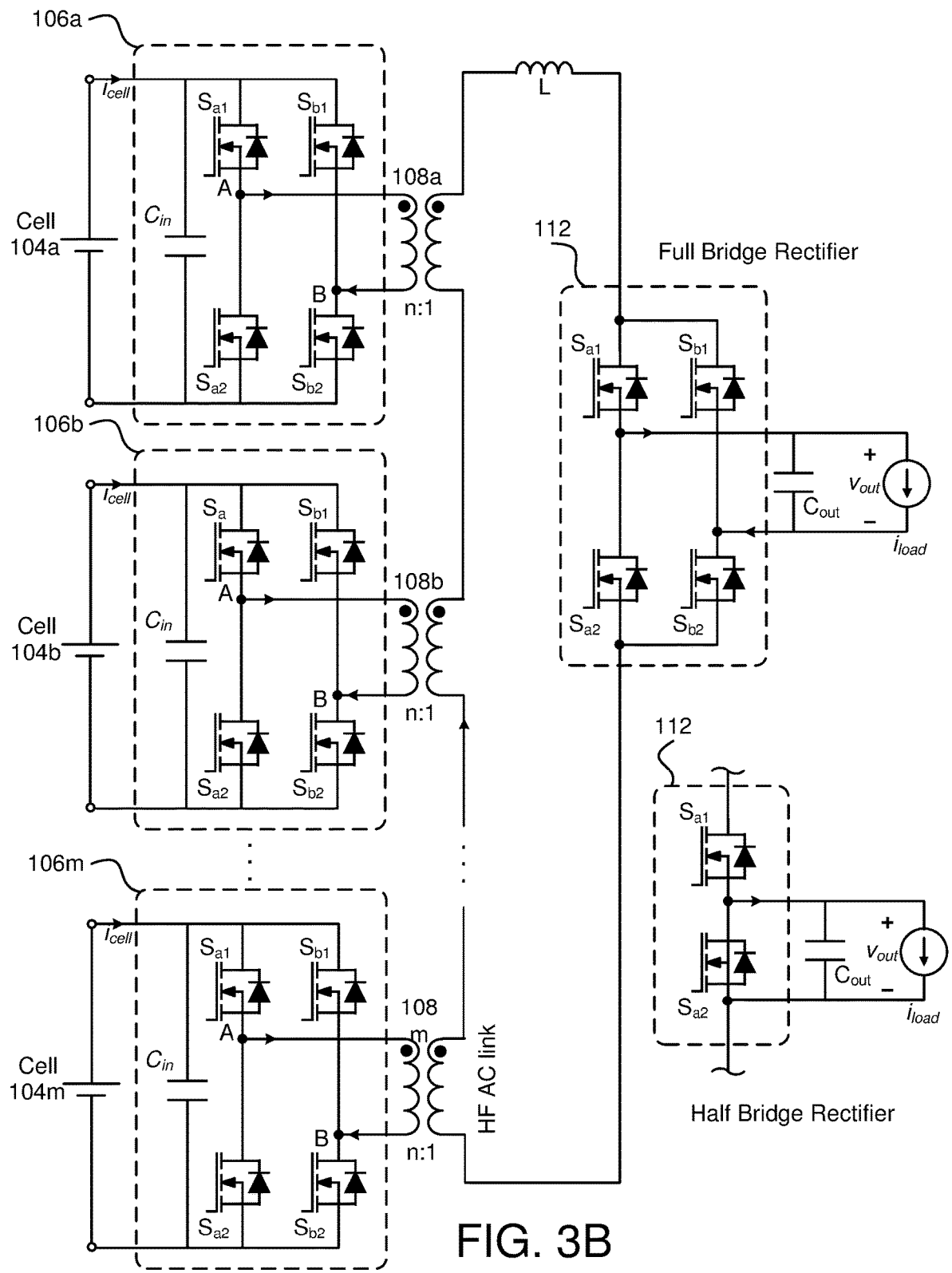
FIG. 3B is a schematic block diagram illustrating another embodiment of a system with m DC voltage sources feeding a high-frequency link coupled multi-port converter topology in a non-resonant dual active topology and a full-bridge rectifier and an alternate half-bridge rectifier topology, which is connected to a load.

FIG. 3B is a schematic block diagram illustrating another embodiment of a system 301 with m DC voltage sources in the form of batter cells 104a-104m feeding a high-frequency link coupled multi-port converter topology, which is in the form of a non-resonant dual active topology. The non-resonant dual active bridge topology includes a full-bridge switching section 106a-106m and a full-bridge rectifier 112, which is connected to a load $i_{load}$, with an inductor L in between the transformers 108a-108m and the rectifier 112. An alternate half-bridge rectifier topology 112 is also depicted.

Steady-state equations based on fundamental approximation are provided below. The derived equations show the relation between port parameters and control parameters. Sinusoidal approximation is used for the analysis with the assumption that the quality factor is high enough for the tank current to be sinusoidal. Effective tank elements are lumped and referred to the secondary side for the analysis. The equivalent circuit and phasor diagram are shown for a three-source approach in FIG. 4.

Figure 4:
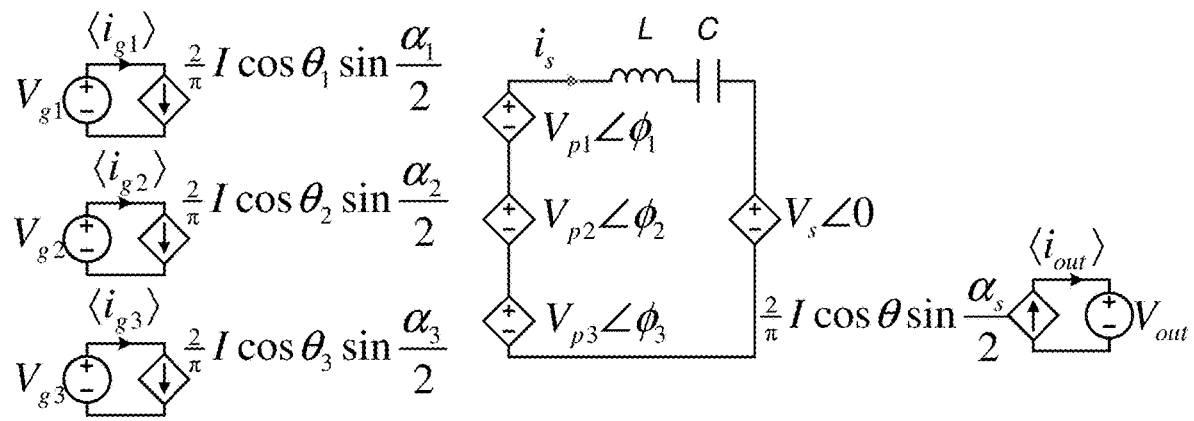
FIG. 4 is a schematic block diagram illustrating an equivalent circuit diagram of the system of FIG. 3A.
Figure 5:
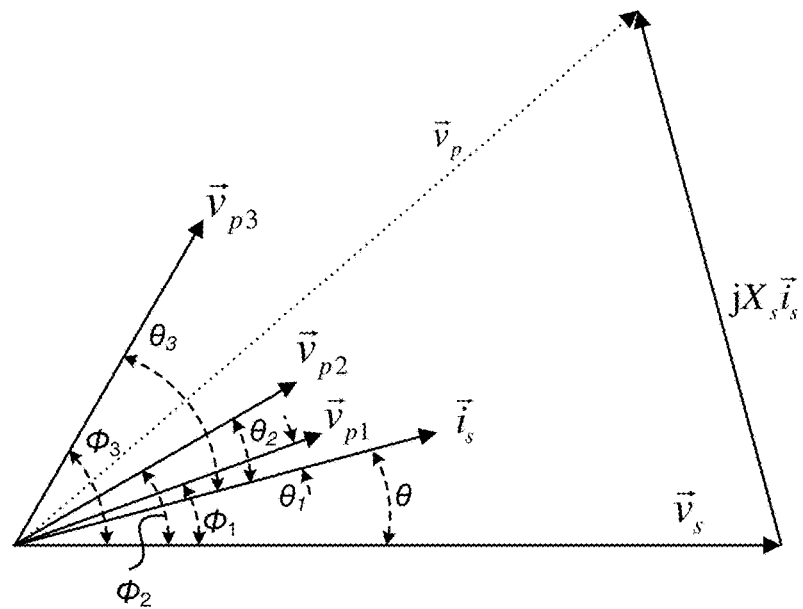
FIG. 5 is a phasor diagram illustrating phasors of the equivalent circuit diagram of FIG. 4.

FIG. 4 is a schematic block diagram illustrating an equivalent circuit diagram 400 of the system 300 of FIG. 3. FIG. 5 is a phasor diagram 500 illustrating phasors of the equivalent circuit diagram of FIG. 4. The phasor diagram 500 of FIG. 5 displays $\theta_1$, $\phi_1$, $\theta_2$, $\phi_2$, $\theta_3$, and $\phi_3$ are depicted with respect to $\vec{v}_{p1}$, $\vec{v}_{p2}$, $\vec{v}_{p3}$, $\vec{v}_s$ and $\vec{i}_s$.

Each primary bridge generates a square-wave voltage. The phase shifts $\phi_1$, $\phi_2$, $\phi_3$ of these voltages with respect to secondary are used as control variables. The secondary bridge voltage is used as reference for the phasor analysis. The primary bridge voltages are given as:

$$v_{p1} = \frac{4}{\pi} V_{g1}(\cos\phi_1 + j\sin\phi_1) \quad (1)$$

$$v_{p2} = \frac{4}{\pi} V_{g2}(\cos\phi_2 + j\sin\phi_2)$$

$$v_{p3} = \frac{4}{\pi} V_{g3}(\cos\phi_3 + j\sin\phi_3).$$

The effective primary voltage is:

$$v_p = \frac{4}{\pi}[V_{g1}\cos\phi + V_{g2}\cos\phi_2 + V_{g3}\cos\phi_3 + j(V_{g1}\sin\phi_1 + V_{g2}\sin\phi_2 + V_{g3}\sin\phi_3)]. \quad (2)$$

The effective tank current is:

$$i = \frac{v_p + v_s}{jX_s} = \frac{4}{\pi X_s}[V_{g1}\sin\phi_1 + V_{g2}\sin\phi_2 + V_{g3}\sin\phi_3 + j(V_{out} - V_{g1}\cos\phi_1 - V_{g2}\cos\phi_2 - V_{g3}\cos\phi_3)] \quad (3)$$

Individual primary/input port powers $P_1$, $P_2$, $P_3$ and port average currents $I_{g1}$, $I_{g2}$, $I_{g3}$ are given by:

$$P_1 = \frac{8V_{g1}}{\pi^2 X_s}[V_{out}\sin\phi_1 + V_{g2}\sin(\phi_2 - \phi_1) + V_{g3}\sin(\phi_3 - \phi_1)] \quad (4)$$

$$P_2 = \frac{8V_{g2}}{\pi^2 X_s}[V_{out}\sin\phi_2 + V_{g1}\sin(\phi_1 - \phi_2) + V_{g3}\sin(\phi_3 - \phi_2)]$$

$$P_3 = \frac{8V_{g3}}{\pi^2 X_s}[V_{out}\sin\phi_3 + V_{g1}\sin(\phi_1 - \phi_3) + V_{g2}\sin(\phi_2 - \phi_3)]$$

$$I_{g1} = \frac{8}{\pi^2 X_s}[V_{out}\sin\phi_1 + V_{g2}\sin(\phi_2 - \phi_1) + V_{g3}\sin(\phi_3 - \phi_1)] \quad (5)$$

$$I_{g2} = \frac{8}{\pi^2 X_s}[V_{out}\sin\phi_2 + V_{g1}\sin(\phi_1 - \phi_2) + V_{g3}\sin(\phi_3 - \phi_2)]$$

$$I_{g3} = \frac{8}{\pi^2 X_s}[V_{out}\sin\phi_3 + V_{g1}\sin(\phi_1 - \phi_3) + V_{g2}\sin(\phi_2 - \phi_3)]$$

Output port power $P_{out}$ and output current $I_{out}$ are given as:

$$P_{out} = \frac{8V_{out}}{\pi^2 X_s}[V_{g1}\sin\phi_1 + V_{g2}\sin\phi_2 + V_{g3}\sin\phi_3] \quad (6)$$

$$I_{out} = \frac{8}{\pi^2 X_s}[V_{g1}\sin\phi_1 + V_{g2}\sin\phi_2 + V_{g3}\sin\phi_3] \quad (7)$$

The above sinusoidal analysis can be extended to m input ports. The $k^{th}$ port power $P_k$ and average current $I_{gk}$ can be then given as:

$$P_k = \frac{8V_{gk}}{\pi^2 X_s}[V_{out}\sin\phi_k + V_{g1}\sin(\phi_1 - \phi_k) + V_{g2}\sin(\phi_2 - \phi_k) + \ldots + V_{gm}\sin(\phi_m - \phi_k)] \quad (8)$$

$$I_{gk} = \frac{8}{\pi^2 X_s}[V_{out}\sin\phi_k + V_{g1}\sin(\phi_1 - \phi_k) + V_{g2}\sin(\phi_2 - \phi_k) + \ldots + V_{gm}\sin(\phi_m - \phi_k)] \quad (9)$$

Output port power and average current with m input ports can be given as:

$$P_{out} = \frac{8V_{out}}{\pi^2 X_s}[V_{g1}\sin\phi_1 + V_{g2}\sin\phi_2 + V_{g3}\sin\phi_3 + \ldots + V_{gk}\sin\phi_k] \quad (10)$$

$$I_{out} = \frac{8}{\pi^2 X_s}[V_{g1}\sin\phi_1 + V_{g2}\sin\phi_2 + V_{g3}\sin\phi_3 + \ldots + V_{gk}\sin\phi_k] \quad (11)$$

In one embodiment, the power converter 102 includes a single magnetic core with the secondary winding and each of the primary windings wound around the single magnetic core. In another embodiment, a magnetic structure includes two or more magnetic cores and the secondary winding goes through all magnetic cores. In a further embodiment, each inverter 106 is paired with separate transformer 108 with a separate magnetic core. One of skill in the art will recognize other ways to have multiple primary windings and one common secondary winding coupled through one or more magnetic cores. Where multiple transformers 108*a-m* are used, the secondary winding 110 is wound through the transformers 108*a-m* so that the secondaries of the transformers 108*a-m* are connected in series.

Where battery cells 104*a-m* are used, the battery cells 104*a-m* are typically closely packed together. Therefore, it is beneficial to have a common secondary winding 110 that is wound through all the transformer cores. For the proposed topology, there will be no need to make a connection between adjacent terminals where the secondary winding 110 travels continuously through the transformers 108*a-m*. An effective mean length turn of the secondary winding 110 using this approach will be lower if distance between adjacent magnetic cores is kept lower than a width of the magnetic cores, which leads to lower resistance than the cumulative individual transformers winding resistance if there were connections between secondary windings of each transformer 108*a-m*.

Having a common winding (e.g. the secondary winding 110) that is wound through all the transformer cores also has other benefits. For example, if high voltage isolation is required between the primary and the secondary of the transformers 108*a-m*, there is no need to make high voltage connections between adjacent terminals. This simplifies the secondary winding 110 since there are no high voltage terminations required between transformers 108*a-m*. Also, an effective length of the secondary winding using this approach can be lower than having individual transformers if distance between two neighboring cores is lower than the width of the magnetic cores.

Two possible realizations using standard core-type and shell-type approaches with commercially available core geometries are given in FIGS. 6A, 6B, 7A and 7B. The turns ratios shown FIGS. 6A, 6B, 7A and 7B is 2:1 for each individual transformer 108 but it can be any ratio required by design.

Figure 6A:
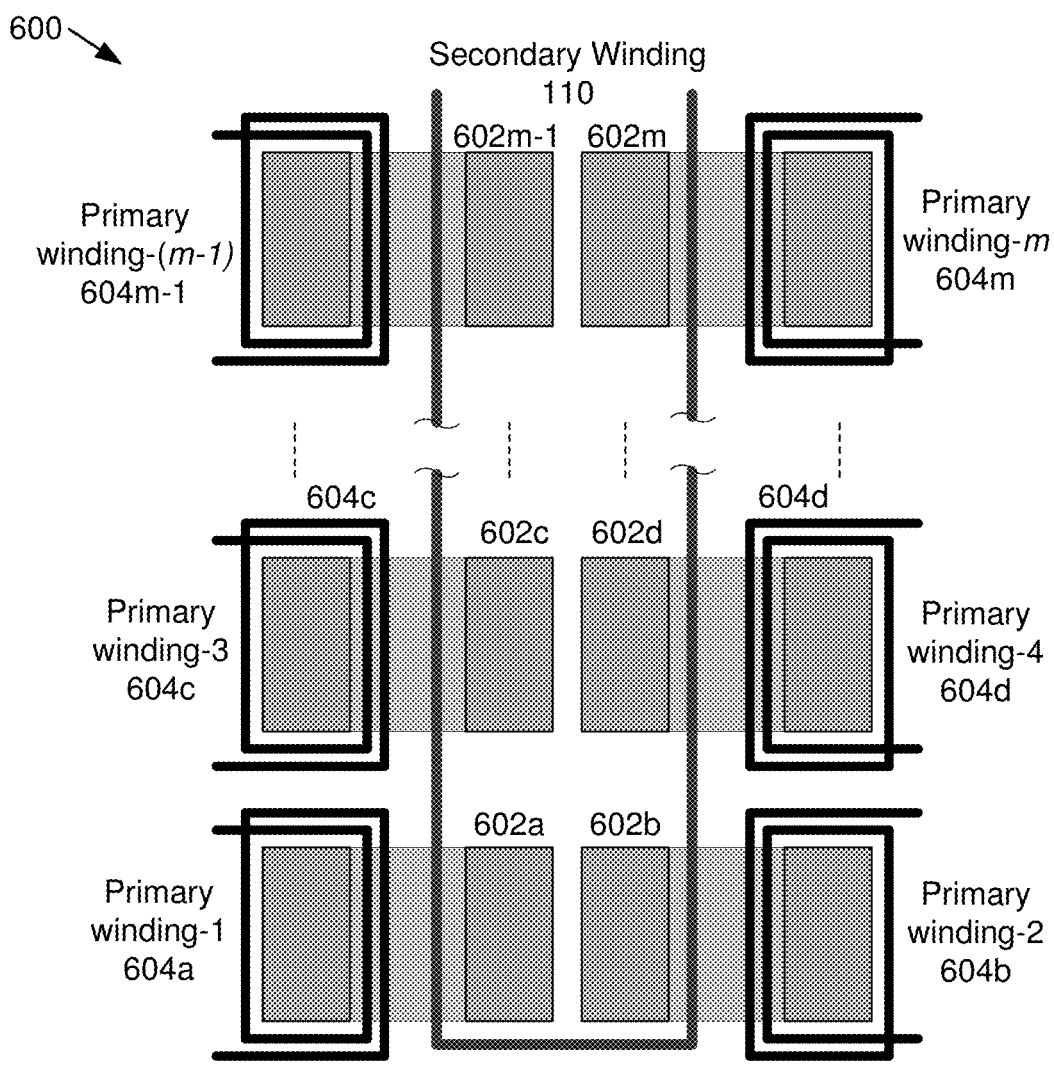
FIG. 6A is a horizontal section view of core-type magnetic cores where the section is cut through adjacent magnetic cores.
Figure 6B:
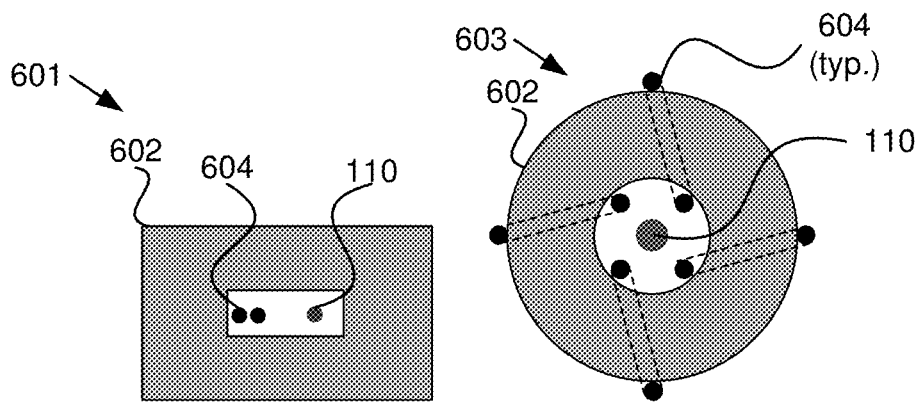
FIG. 6B is a vertical section view and a top view of a magnetic core of FIG. 6A.

FIG. 6A is a horizontal section view 600 of core-type magnetic cores 602a-m where the section is cut through adjacent magnetic cores 602a-m and FIG. 6B is a vertical section view 601 and a top view 603 of a magnetic core 602 (e.g. 602a) of FIG. 6A. FIG. 6A depicts each primary winding 604a-m with two turns and a secondary winding 110 that passes directly through the magnetic cores 602a-m. The left diagram in FIG. 6B is a vertical cross section of a magnetic core 602 where the primary winding 604 and secondary winding 110 pass through a center of the magnetic core 602. The right diagram in FIG. 6B depicts a magnetic core 602 with multiple primary windings 604, which is an alternate design that may be used with the power converter 102.

Figure 7A:
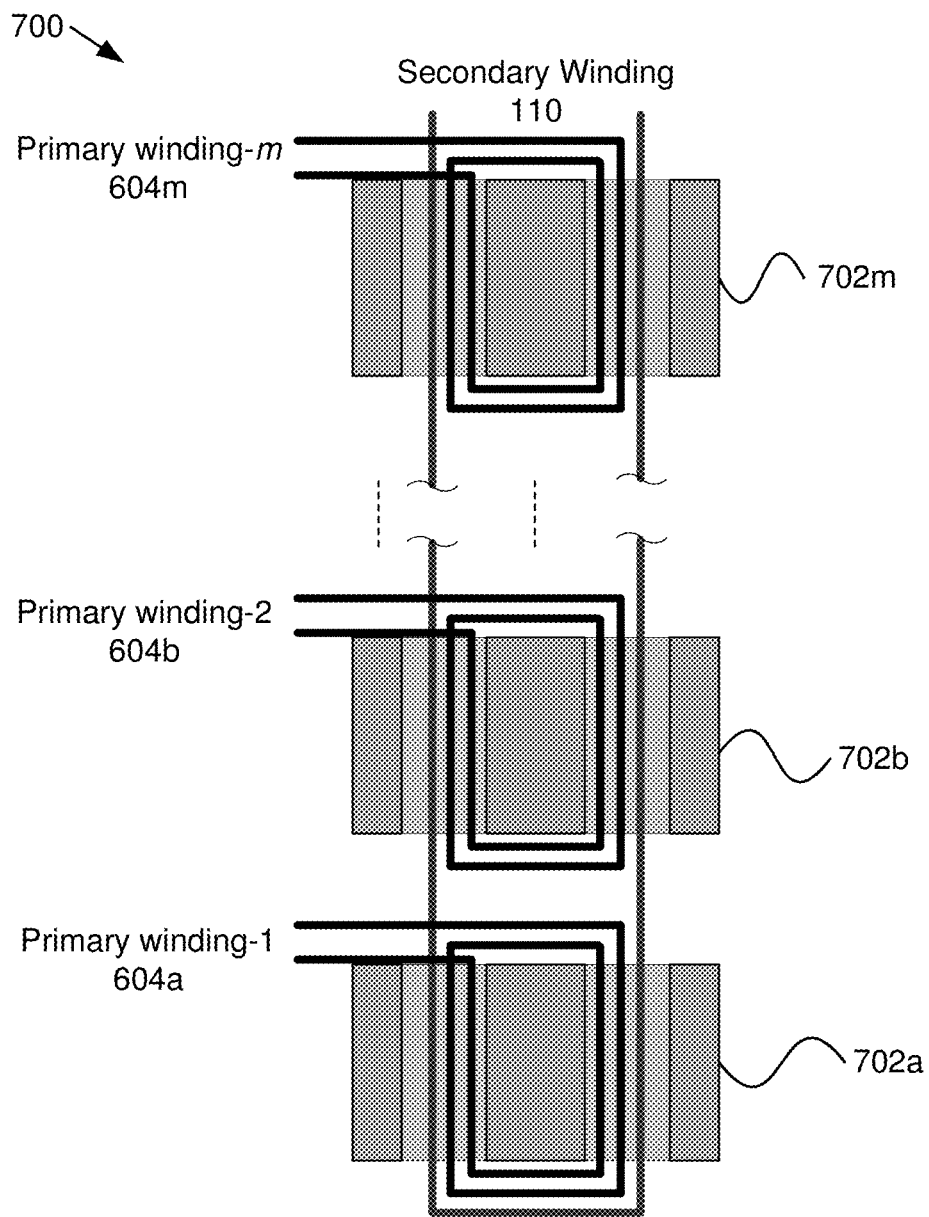
FIG. 7A is a horizontal section view of shell-type magnetic cores where the section is cut through adjacent magnetic cores.
Figure 7B:
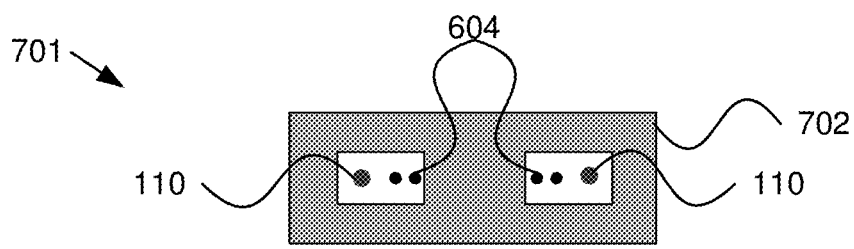
FIG. 7B is a vertical section view a magnetic core of FIG. 7A.

FIG. 7A is a horizontal section view 700 of shell-type magnetic cores 702a-m where the section is cut through adjacent magnetic cores 702a-m and FIG. 7B is a vertical section view 701 a magnetic core 702 of FIG. 7A. In the embodiment of FIGS. 7A and 7B, the magnetic cores 702a-m are stacked vertically so that the secondary winding 110 loops up and back through the magnetic cores 702a-m.

Figure 8:
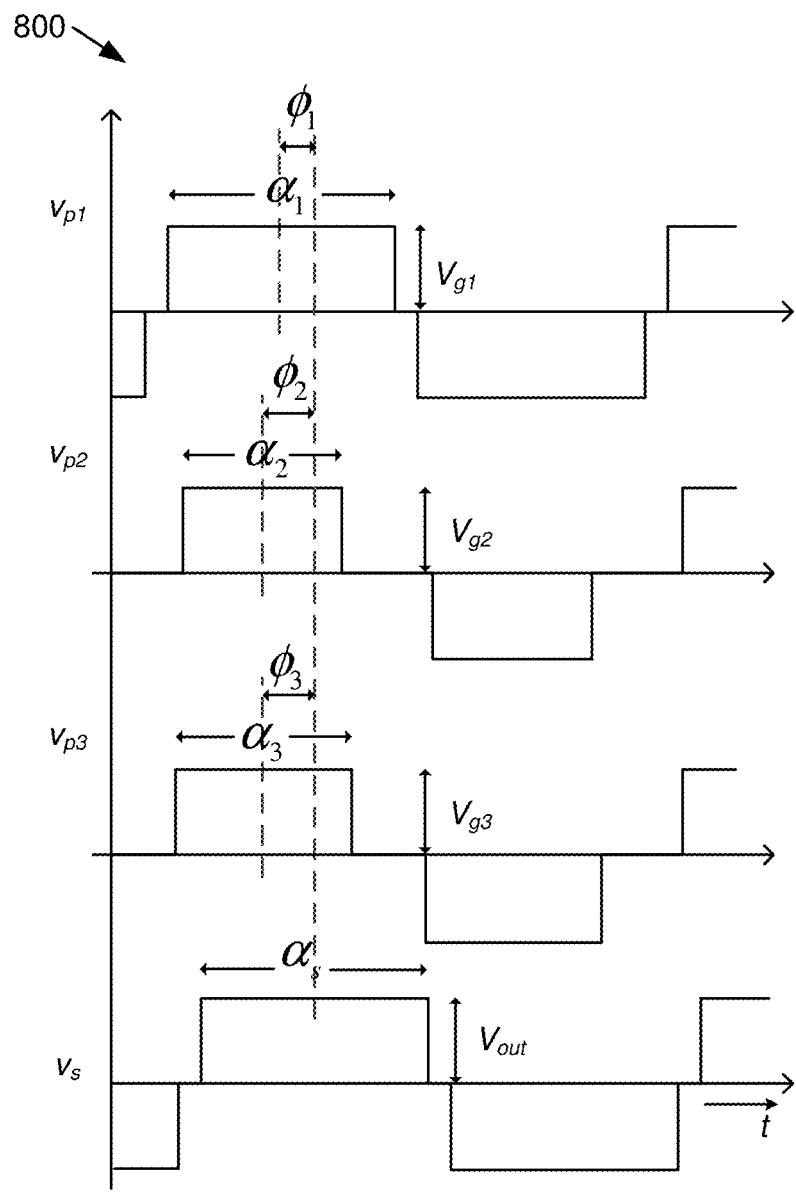
FIG. 8 is a schematic drawing of primary port waveforms and a secondary waveform illustrating phase shift and duty cycle variations.

FIG. 8 is a schematic drawing 800 of primary port waveforms $v_{p1}$, $v_{p2}$, $v_{p3}$ and a secondary waveform $v_s$ illustrating phase shift $\phi_1$, $\phi_2$, $\phi_3$ and duty cycle $\alpha_1$, $\alpha_2$, $\alpha_3$, as variations, which may be used as control variables. The waveforms of FIG. 8 are for a three-port power converter 102 of the system 300 of FIG. 3. The primary port voltages $v_{p1}$ $v_{p2}$, $v_{p3}$ and secondary voltage $v_s$ are depicted in the system 300 of FIG. 3. In the embodiment depicted in FIG. 8, a reference point for the phase shifts $\phi_1$, $\phi_2$, $\phi_3$ are measured from a midpoint of the secondary waveform $v_s$. In other control schemes, a leading edge of a pulse width of the secondary voltage $v_s$ may be used. A peak voltage of each of the primary port waveforms $v_{p1}$, $v_{p2}$, $v_{p3}$ is a corresponding DC voltage source $V_{g1}$, $V_{g2}$, $V_{g3}$ where the rectifiers 106a-c connect between the voltage sources $V_{g1}$, $V_{g2}$, $V_{g3}$ and ground.

In the waveforms of FIG. 8, phase shift $\phi_1$, $\phi_2$, $\phi_3$ and duty cycle $\alpha_1$, $\alpha_2$, $\alpha_3$, $\alpha_s$ may be used as control variables. Typically, less control variables are used for controlling output voltage vow or load current $i_{load}$ and the three primary ports. A minimum of m+1 control variables are typically a minimum requirement. For example, phase shift $\phi_1$, $\phi_2$, $\phi_3$ may be set to be equal and the duty cycles $\alpha_1$, $\alpha_2$, $\alpha_3$, $\alpha_s$ may be used as control variables. The phase shift $\phi_3$ for the third primary port is depicted in the phasor diagram of FIG. 5 with respect to the primary port voltages $v_{p1}$, $v_{p2}$, $v_{p3}$ and secondary voltage $v_s$ and the phase shift $\phi_1$, $\phi_2$, for the first and second primary voltages $v_{p1}$, $v_{p2}$ may be displayed in the diagram, which would correlate to the waveforms of FIG. 8.

Figure 9:
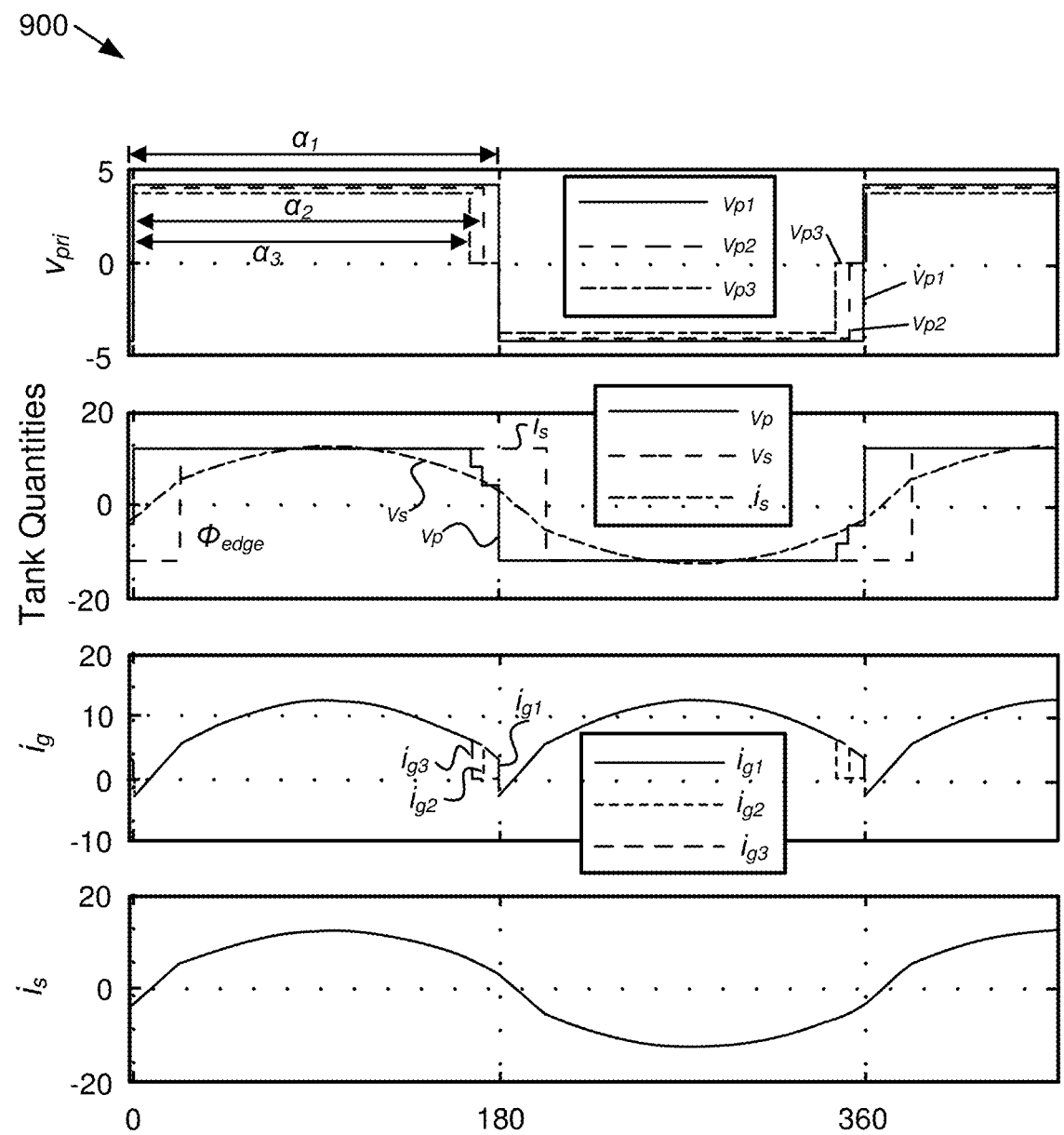
FIG. 9 depicts simulation results for waveforms of a of the system of FIG. 3A displaying a switching cycle.

FIG. 9 depicts simulation results 900 for waveforms of a of the system 300 of FIG. 3 displaying a switching cycle. In the waveforms, use a leading edge for phase shift and the phase shift $\phi_1$, $\phi_2$, $\phi_3$ for primary port voltages $v_{p1}$, $v_{p2}$, $v_{p3}$ are equal and are depicted as phase shift $\phi_{edge}$. The duty cycle $\alpha_1$, $\alpha_2$, $\alpha_3$ is used as a control variable where the duty cycle $\alpha_1$ and the duty cycle $\alpha_3$ are less than the duty cycle $\alpha_1$. As can be seen from the third waveform down for the source currents $i_{g1}$, $i_{g2}$, $i_{g3}$, the second source current $i_{g2}$ and the third source current $i_{g3}$ are both less than the first source current $i_{g1}$ so that the second and third voltage sources $v_{g2}$, $v_{g3}$ contribute less power to the load than does the first voltage source $v_{g1}$ assuming that the magnitude of the primary source voltages $V_{g1}$, $V_{g2}$, $V_{g3}$ are the same or about the same. Thus, the voltage sources $V_{g1}$, $V_{g2}$, $V_{g3}$ each contribute a different amount of power to the load and the power for each primary port is summed on the secondary of the transformers 108a-c and then the total power is transferred to the load.

Figure 10:
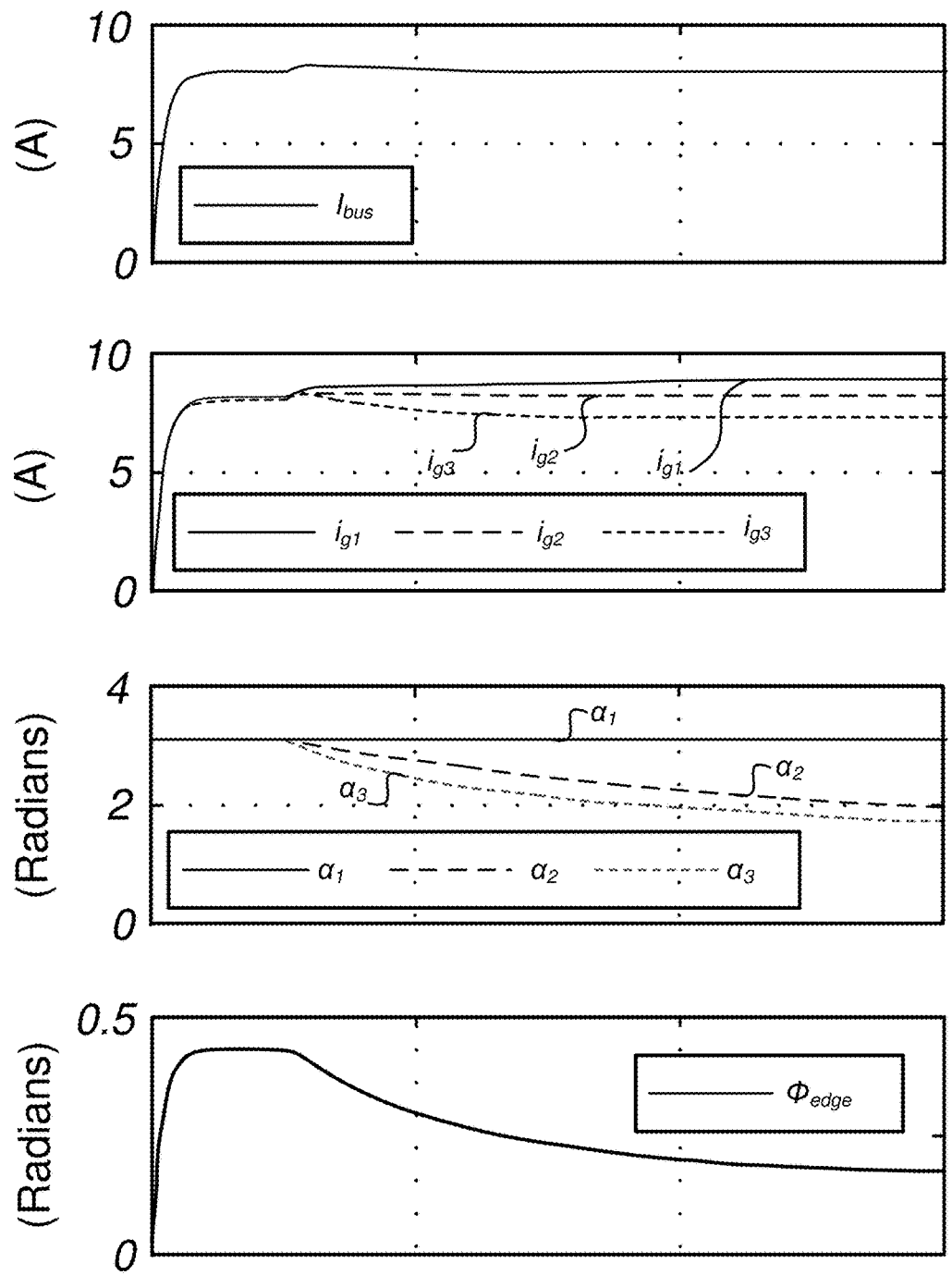
FIG. 10 depicts simulation results for waveforms of the system of FIG. 3A on a longer time scale.

FIG. 10 depicts simulation results 1000 for waveforms of the system of FIG. 3 on a longer time scale. The simulation results 1000 are for a closed control loop around each primary port. The results 1000 depict varying the common phase shift $\phi_{edge}$. Note that the duty cycle $\alpha_1$ for the first primary port is maintained constant and the duty cycles $\alpha_2$, $\alpha_3$, vary with the common phase shift $\phi_{edge}$ to keep $i_{bus}$ constant, which is output current of the rectifier 112 (labeled $i_{out}$ in FIG. 3). Another control loop that regulates output voltage or load current may then adjust phase shift $\phi_{edge}$ and/or a reference duty cycle (the first duty cycle $\alpha_1$ in this case) to maintain the output voltage or load current.

In some embodiments, a controller regulates output voltage at the output terminals or output current to the load at the output terminals (but typically not both) for varying load conditions and regulates power drawn from each DC voltage source such that power from the DC voltage sources are allowed to differ from each other. The controller regulates output voltage or load current and regulates power from the DC voltage sources by adjusting switching of the inverters 106 and switching of switches in the rectifier 112. In some embodiments, the controller regulates output voltage or load current and regulates power from the DC voltage sources $V_{g1}$, $V_{g2}$, $V_{g3}$ ... $V_{gm}$ by adjusting switching of the inverters 106 and switching of switches in the rectifier 112 by regulating a phase shift $\phi_1$, $\phi_2$, $\phi_3$, ... $\phi_m$ between switching of the rectifier 112 and switching of each of the inverters 106 and by regulating a duty cycle $\alpha_s$ of switching of the rectifier 112 and a duty cycle $\alpha_1$, $\alpha_2$, $\alpha_3$, ... $\phi_m$ of switching of each inverter 106. In other embodiments, the controller uses a switching waveform of the rectifier 112 as a reference point and determines a phase shift $\phi_1$, $\phi_2$, $\phi_3$, ... $\phi_m$ for each inverter 106 based on the rectifier reference point.

In some embodiments, a turns ratio of a primary winding to the secondary winding of each magnetic core is n and a primary effective voltage across a secondary side of a $k^{th}$ magnetic core is $n\vec{v}_{p,k}$ and a primary effective voltage across the secondary side of a $k^{th}$ magnetic core of m magnetic cores:

$$n\sum_{k=1}^{m}\vec{v}_{p,k} \qquad (12)$$

and each a phasor for the primary effective voltage of a $k^{th}$ magnetic core is:

$$\vec{v}_{p,k} = V_{p,k}(\cos\phi_k + j\sin\phi_k) \qquad (13)$$

where $\phi_k$ is a phase shift between a switching waveform of the rectifier 112 and a switching waveform of the $k^{th}$ inverter 106 and $$V_p = \sum_{k=1}^{m}\frac{4}{\pi}\sin\left(\frac{\alpha_k}{2}\right). \qquad (14)$$

In other embodiments, the controller regulates output voltage or output current and regulates power drawn from each DC voltage source $V_{g1}$, $V_{g2}$, $V_{g3}$ ... $V_{gm}$ by maintaining a fixed phase shift (e.g. $\phi_{edge}$) between switching of the rectifier 112 and switching of each of the inverters 106 and varies the duty cycle of each inverter 106. In other embodiments, the controller regulates output voltage or output current and regulates power drawn from each DC voltage source $V_{g1}$, $V_{g2}$, $V_{g3}$ ... $V_{gm}$ by generating a full square wave in each inverter 106 and in the rectifier 112 and by maintaining a reference phase shift Or between switching of the rectifier 112 and switching of each of the inverters 106 and varies the phase shift $\phi_1$, $\phi_2$, $\phi_3$, ... $\phi_m$ of each inverter 106 and by controlling each inverter with a delta phase shift $\Delta\phi_1$, $\Delta\phi_2$, $\Delta\phi_3$, ... $\Delta\phi_m$ with respect to the reference phase shift $\Delta\phi_r$. For example, this control technique may be used for half-bridge inverters 106 and a half-bridge rectifier 112.

In yet another embodiment, the power converter 112 is bidirectional and each DC voltage source $V_{g1}$, $V_{g2}$, $V_{g3}$ ... $V_{gm}$ is a battery unit 104a-m with one or more battery cells and the controller regulates output voltage or output current with an outer control loop and regulates power drawn from each of the one or more battery units 104a-m with an inner control loop for each inverter 106a-m based on a battery charging/discharging algorithm.

Each bridge has two control parameters duty cycle $\alpha_k$ and phase-shift $\phi_k$. The power delivered to the secondary depends on the values of duty cycle $\alpha_1$-$\alpha_m$ and phase-shift $\phi_1$-$\phi_m$ of all the bridges. This is clearly seen in the steady-state equations 9-11 for a particular topology (series resonant) realization of the high frequency link. One simple way to implement the control would be to use a global control variable to regulate the output current or voltage and individual control loops that maintain the relative sharing of the load across the input ports. To implement the relative sharing a weighting is given to each port. The port that must have the highest input current sharing is used as the base ($i_{base}$) for determining the weights based on the relative sharing required. In some embodiments, a primary port with a highest current is weighted as 1. And all the other port references will be weighted relative to this highest port and will have weights less than or equal to 1. The actual relative sharing can be calculated as in:

$$w_k^{ref} = \frac{\langle i_{g,k} \rangle}{i_{base}}. \quad (15)$$

where $\langle i_{g,k} \rangle$ is the average source current from a $k^{th}$ DC voltage source.

Figure 11:
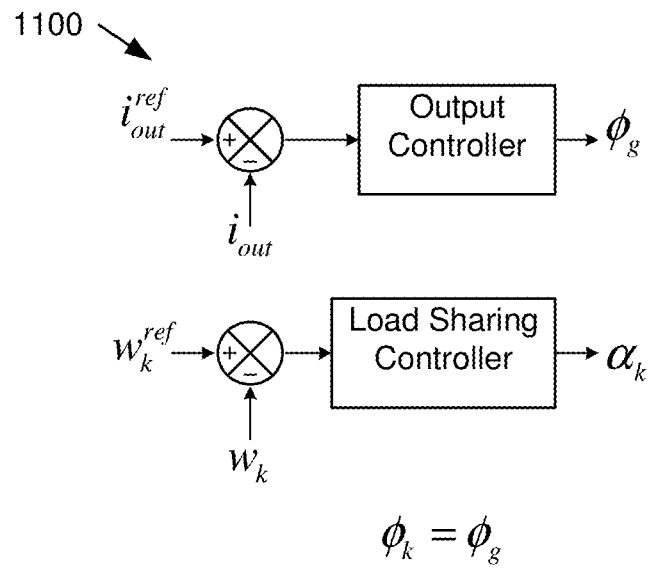
FIG. 11 is a schematic block diagram illustrating one embodiment of a first control option for the systems of FIGS. 1, 3A and 3B.
Figure 12:
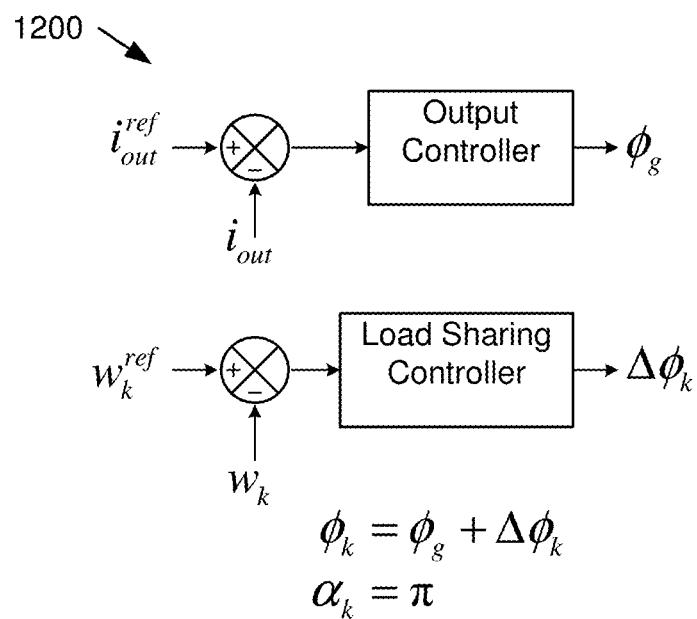
FIG. 12 is a schematic block diagram illustrating one embodiment of a second control option for the systems of FIGS. 1, 3A and 3B.

Two simple control loops are depicted in FIGS. 11 and 12. FIG. 11 is a schematic block diagram 1100 illustrating one embodiment of a first control option for the systems 100, 300 of FIGS. 1 and 3. The upper control block includes a summation block that gives an error signal between a reference output current $i_{out}^{ref}$ and output current $i_{out}$, which is typically the load current $i_{load}$ depicted in FIGS. 1 and 3. The output of the summation block is fed to an output controller, which in turn provides a reference phase shift $\phi_g$ where this reference phase shift $\phi_g$ is the same for each primary port phase shift $\phi_k$. The lower control block is typical for each inverter 106 and sums a reference weighting factor $w_k^{ref}$ with a weighting factor of equation 15 for a particular primary port k. Each weighting factor for a primary port k is based on source current $i_{g,k}$ of the applicable DC voltage source. A battery charging/discharging algorithm may be used to set the weighting factor $w_k^{ref}$ for each battery unit 104k. The resulting error signal is fed to a load sharing controller, which produces a duty cycle $\alpha_k$ for the applicable inverter 106k.

For the control loop of FIG. 11, the controller uses the same phase shift $\phi_g$ for all the bridges to regulate output and uses individual duty cycles $\alpha_1$-$\alpha_m$ to implement the relative load sharing. All the primary bridge phases are maintained equal and hence the phase shift $\phi_k$ is equal to the global control parameter $\phi_g$. The load sharing control loop decides the duty cycle $\alpha_k$ for the bridge k.

FIG. 12 is a schematic block diagram illustrating one embodiment of a second control option 1200 for the systems 100, 300 of FIGS. 1 and 3. The upper control block includes a summation block that gives an error signal between a reference output current $i_{out}^{ref}$ and output current $i_{out}$, which is typically the same as the load current $i_{load}$ depicted in FIGS. 1 and 3 at steady state. The output of the summation block is fed to an output controller, which in turn provides a reference phase shift $\phi_g$. The lower control block is typical for each inverter 106 and sums a reference weighting factor $w_k^{ref}$ with the weighting factor of equation 15 for a particular primary port k. Each weighting factor for a primary port k is based on source current $i_{g,k}$ of the applicable DC voltage source. A battery charging/discharging algorithm may be used to set the weighting factor $w_k^{ref}$ for each battery unit 104k. The resulting error signal is fed to a load sharing controller, which produces a delta phase shift $\Delta\phi_k$ for the applicable inverter 106k. The delta phase shift $\Delta\phi_k$ is added to the reference phase shift $\phi_g$ to produce a phase shift $\phi_k$ fed to the applicable inverter 106k. For the control scheme, each inverter 106 and the rectifier produce quasi square wave of a 50 percent duty cycle.

If the primary and secondary bridges are only able to generate full-square voltages, for example, half bridge topology, then $\alpha_k=\pi$. Then $\phi_1$, $\phi_2$, $\phi_3$, ... $\phi_m$ are the only control variables available. A new global variable can be defined $\phi_g$ to implement the global control loop and $\Delta\phi_1$, $\Delta\phi_2$, $\Delta\phi_3$, ... $\Delta\phi_m$ can be the local control variables that can be used to implement the relative load sharing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power converter apparatus comprising:
  a plurality of inverters, each inverter receiving power from a separate direct current ("DC") voltage source, each inverter comprising switches and generating an alternating current ("AC") waveform at an output of the inverter;
  a magnetic structure comprising:
    two or more magnetic cores;
    a primary winding for each inverter, each primary winding connected to an output a corresponding inverter, each primary winding coupled to a magnetic core of the two or more magnetic cores; and
    a single secondary winding coupled to the two or more magnetic cores to which each primary winding is coupled; and
  a rectifier that receives an AC waveform from the secondary winding, that rectifies the AC waveform and is connected to a load at output terminals,
  wherein the secondary winding comprises a secondary bus and the two or more magnetic cores of the magnetic structure are arranged to provide a pathway for the secondary winding that minimizes a length of the secondary winding.

2. The apparatus of claim 1, further comprising a resonant tank connected in series between the secondary winding and the rectifier, the resonant tank comprising a resonant inductor and a resonant capacitor connected in series.

3. The apparatus of claim 1, wherein the apparatus is a non-resonant dual-active bridge topology with an inductor connected between the secondary winding and the rectifier.

4. The apparatus of claim 1, wherein each inverter of the plurality of inverters is a full-bridge inverter comprising four switches.

5. The apparatus of claim 1, wherein the rectifier is a full-bridge rectifier comprising four switches and further comprising a low-pass filter, the low-pass filter comprising a capacitor connected in parallel with the output terminals.

6. The apparatus of claim 1, further comprising a controller, wherein the controller:
regulates one of output voltage at the output terminals and output current to the load at the output terminals for varying load conditions; and
regulates power drawn from each DC voltage source such that power from the DC voltage sources are allowed to differ from each other,
wherein the controller regulates output voltage or load current and regulates power from the DC voltage sources by adjusting switching of the inverters and switching of switches in the rectifier.

7. The apparatus of claim 6, wherein the controller regulates output voltage or load current and regulates power from the DC voltage sources by adjusting switching of the inverters and switching of switches in the rectifier by regulating a phase shift between switching of the rectifier and switching of each of the inverters and by regulating a duty cycle of switching of the rectifier and a duty cycle of switching of each inverter.

8. The apparatus of claim 7, wherein the controller uses a switching waveform of the rectifier as a reference point and determines a phase shift for each inverter based on the rectifier reference point.

9. The apparatus of claim 7, wherein the plurality of inverters comprises m inverters and wherein the two or more magnetic cores comprises m magnetic cores and wherein a turns ratio of a primary winding of an inverter of the m inverters to the secondary winding of each magnetic core of the m magnetic cores is n and an effective primary voltage across a secondary side of a $k^{th}$ magnetic core is $n\vec{v}_{p,k}$ and an effective primary voltage across the secondary side of m magnetic cores is:

$$n\sum_{k=1}^{m}\vec{v}_{p,k}$$

and each phasor for the effective primary voltage of a $k^{th}$ magnetic core of the m magnetic cores is:

$$\vec{v}_{p,k}=V_{p,k}(\cos\phi_k+j\sin\phi_k)$$

where $\phi_k$ is a phase shift between a switching waveform of the rectifier and a switching waveform of the $k^{th}$ inverter and $V_{p,k}$ is a magnitude of the output voltage of the $k^{th}$ inverter and $$V_p=\sum_{k=1}^{m}\frac{4}{\pi}\sin\left(\frac{\alpha_k}{2}\right)$$

where $V_p$ is an effective primary voltage across m magnetic cores.

10. The apparatus of claim 6, wherein the controller regulates output voltage or output current and regulates power drawn from each DC voltage source by adjusting switching of the inverters and switching of switches in the rectifier by maintaining a fixed phase shift between switching of the rectifier and switching of each of the inverters and by regulating a duty cycle of switching of the rectifier and varying a duty cycle of switching of each inverter.

11. The apparatus of claim 6, wherein the controller regulates output voltage or output current and regulates power drawn from each DC voltage source by generating a full square wave in each inverter and in the rectifier and by maintaining a reference phase shift between switching of the rectifier and switching of each of the inverters and by varying the phase of each inverter and by controlling each inverter with a delta phase shift with respect to the reference phase shift.

12. The apparatus of claim 6, wherein the apparatus is bidirectional and each DC voltage source comprises one or more battery cells and the controller regulates output voltage or output current with an outer control loop and regulates power drawn from each of the one or more battery cells with an inner control loop for each inverter based on a battery charging/discharging algorithm.

13. The apparatus of claim 6, wherein each inverter is a half-bridge inverter and the controller regulates power from each DC voltage source by adjusting a phase shift between a switching waveform of the rectifier and switching waveforms of the inverters.

14. The apparatus of claim 1, wherein the inverters and the rectifier each operate at a same fixed switching frequency.

15. The apparatus of claim 1, wherein the secondary winding comprises a planar bus in a U-shaped configuration and the magnetic cores are arranged in two rows next to each other to minimize the length of the secondary winding, wherein the secondary winding passes once through each magnetic core.

16. A system comprising:
a plurality of battery units, each battery unit comprising one or more battery cells, each battery unit acting as a direct current ("DC") voltage source; and
a battery charge/discharge unit comprising:
a plurality of inverters, each inverter receiving power from a battery unit of the plurality of battery units, each inverter comprising switches and generating an alternating current ("AC") waveform at an output of the inverter;
a magnetic structure comprising:
two or more magnetic cores;
a primary winding for each inverter, each primary winding connected to an output a corresponding inverter, each primary winding coupled to a magnetic core of the two or more magnetic cores; and
a single secondary winding coupled to the two or more magnetic cores to which each primary winding is coupled; and a rectifier that receives an AC waveform from the secondary winding, that rectifies the AC waveform and is connected to a load at output terminals, wherein the secondary winding comprises a secondary bus and the two or more magnetic cores of the magnetic structure are aligned to provide a pathway for the secondary winding that minimizes a length of the secondary winding.

17. The system of claim 16, further comprising a resonant tank connected in series between the secondary winding and the rectifier, the resonant tank comprising a resonant inductor and a resonant capacitor connected in series.

18. The system of claim 16, further comprising a controller, wherein the controller:

regulates one of output voltage at the output terminals and output current to the load at the output terminals for varying load conditions; and regulates power drawn from each DC voltage source such that power from the DC voltage sources are allowed to differ from each other, wherein the controller regulates output voltage or load current and regulates power from the DC voltage sources by adjusting switching of the inverters and switching of switches in the rectifier.

19. The system of claim 18, wherein the controller regulates output voltage or load current and regulates power from the DC voltage sources by adjusting switching of the inverters and switching of switches in the rectifier by regulating a phase shift between switching of the rectifier and switching of each of the inverters and by regulating a duty cycle of switching of the rectifier and a duty cycle of switching of each inverter.

20. A power converter apparatus comprising:

a plurality of inverters, each inverter receiving power from a separate direct current ("DC") voltage source, each inverter comprising switches in a full-bridge configuration and generating an alternating current ("AC") waveform at an output of the inverter;

a magnetic structure comprising:

a plurality of magnetic cores;

a primary winding for each inverter, each primary winding connected to an output a corresponding inverter, each primary winding coupled to a separate magnetic core of the plurality of magnetic cores; and a single secondary winding coupled to each magnetic core of the plurality of magnetic cores, wherein the secondary winding comprises a secondary bus and the plurality of magnetic cores of the magnetic structure are aligned to provide a pathway for the secondary winding that minimizes a length of the secondary winding; and a rectifier that receives an AC waveform from the secondary winding, that rectifies the AC waveform and is connected to a load at output terminals, the rectifier comprising switches in a full-bridge configuration;

a resonant tank connected in series between the secondary winding and the rectifier, the resonant tank comprising a resonant inductor and a resonant capacitor connected in series; and a controller that:

regulates one of output voltage at the output terminals and output current to the load at the output terminals for varying load conditions; and regulates power drawn from each DC voltage source such that power from the DC voltage sources are allowed to differ from each other, wherein the controller regulates output voltage or load current and regulates power from the DC voltage sources by adjusting switching of the inverters and switching of switches in the rectifier.

\* \* \* \* \*